United States Patent
Yoo et al.

(10) Patent No.: US 10,093,032 B2
(45) Date of Patent: Oct. 9, 2018

(54) INTEGRATED MULTIPLE RAZOR BLADE AND MANUFACTURING METHOD THEREOF

(71) Applicant: INFINO INC., Chuncheon-si, Gangwondo (KR)

(72) Inventors: Hyoung Seok Yoo, Seoul (KR); Seong Il Jang, Seoul (KR); Myoung Chan Namkung, Bucheon-si (KR); Kwang Sok Yoo, Seoul (KR)

(73) Assignee: INFINO INC., Chuncheon-si, Gangwon-do (KR)

( * ) Notice: Subject to any disclaimer, the term of this patent is extended or adjusted under 35 U.S.C. 154(b) by 0 days.

(21) Appl. No.: 14/890,576

(22) PCT Filed: Mar. 11, 2014

(86) PCT No.: PCT/KR2014/002018
§ 371 (c)(1),
(2) Date: Nov. 11, 2015

(87) PCT Pub. No.: WO2014/208866
PCT Pub. Date: Dec. 31, 2014

(65) Prior Publication Data
US 2016/0121499 A1    May 5, 2016

(30) Foreign Application Priority Data

Jun. 27, 2013  (KR) .......................... 10-2013-0074891
Sep. 16, 2013  (KR) .......................... 10-2013-0111279

(51) Int. Cl.
*B26B 21/56*    (2006.01)
*B26B 21/58*    (2006.01)
(Continued)

(52) U.S. Cl.
CPC ............ *B26B 21/56* (2013.01); *B23P 15/403* (2013.01); *B26B 21/4068* (2013.01); *B26B 21/58* (2013.01)

(58) Field of Classification Search
CPC ..... B26B 21/56; B26B 21/4068; B26B 21/58; B26B 15/403
(Continued)

(56) References Cited

U.S. PATENT DOCUMENTS 3,488,764 A * 1/1970 Welsh ..................... B26B 21/06
                                                              30/32
4,603,477 A * 8/1986 Francis .................. B26B 21/56
                                                              30/346.56
(Continued)

FOREIGN PATENT DOCUMENTS

| FR | 2 927 561 | * | 2/2011 |
| KR | 10-0573755 B1 | | 4/2006 |
| WO | 2004-073449 A1 | | 9/2004 |

OTHER PUBLICATIONS

International Search Report dated Jun. 17, 2014 for PCT/KR2004/002018.

*Primary Examiner* — Hwei C Payer
(74) *Attorney, Agent, or Firm* — Knobbe, Martens, Olson & Bear, LLP

(57) ABSTRACT

An integrated multiple razor blade capable of effectively reducing skin damage caused by the blade, and a manufacturing method thereof are provided. The integrated multiple razor blade may include a frame portion and a razor blade portion. The frame portion has a predetermined length, and comprises a plurality of sections that are separated at a predetermined interval along one direction. The razor blade portion is formed integrally with the frame portion, and has a plurality of razor blades formed perpendicularly to the frame portion.

17 Claims, 16 Drawing Sheets

(51) Int. Cl.
*B26B 21/40* (2006.01)
*B23P 15/40* (2006.01)

(58) Field of Classification Search
USPC .............................................................. 30/50
See application file for complete search history.

(56) References Cited

U.S. PATENT DOCUMENTS

| | | | |
|---|---|---|---|
| 5,018,274 A | 5/1991 | Trotta | |
| 5,546,660 A * | 8/1996 | Burout | B26B 21/227 30/48 |
| 5,579,580 A * | 12/1996 | Althaus | B26B 21/4006 30/50 |
| 6,055,731 A * | 5/2000 | Zucker | B26B 21/24 30/34.2 |
| 6,082,007 A * | 7/2000 | Andrews | B26B 21/00 30/47 |
| 6,216,561 B1 | 4/2001 | Dischler | |
| 7,007,393 B2 * | 3/2006 | Guimont | B26B 21/54 30/346.5 |
| 7,621,203 B2 * | 11/2009 | Aviza | B26B 21/227 30/50 |
| 8,104,179 B2 * | 1/2012 | Nakasuka | B26B 21/227 30/50 |
| 8,327,545 B2 * | 12/2012 | Peterson | B26B 21/565 30/346.61 |
| 9,032,627 B2 * | 5/2015 | Dimitris | B26B 21/225 30/34.1 |
| 2004/0118250 A1 | 6/2004 | White et al. | |
| 2010/0170094 A1 * | 7/2010 | Hayashi | B26B 21/225 30/50 |
| 2016/0121499 A1 * | 5/2016 | Yoo | B26B 21/56 30/50 |

\* cited by examiner

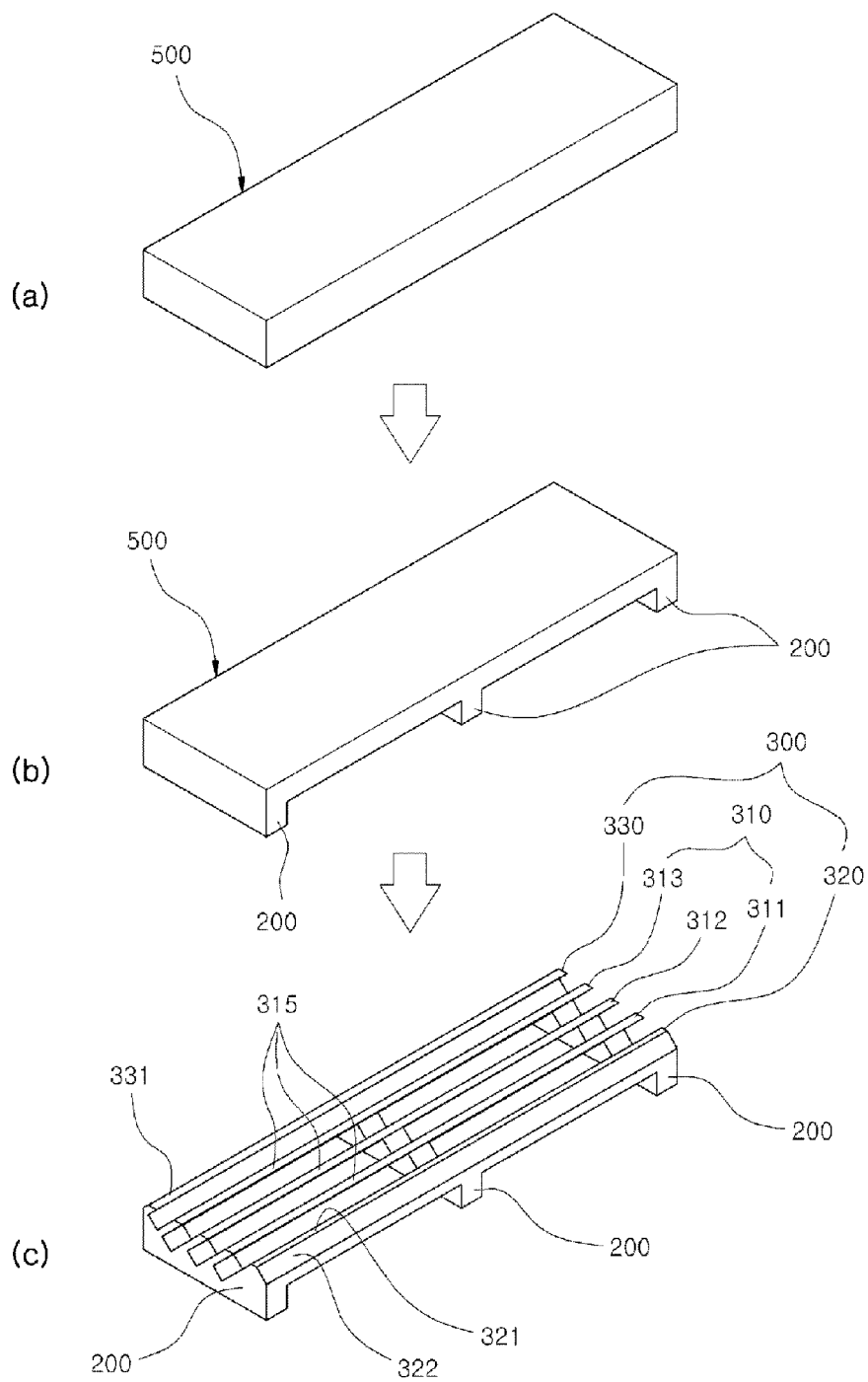

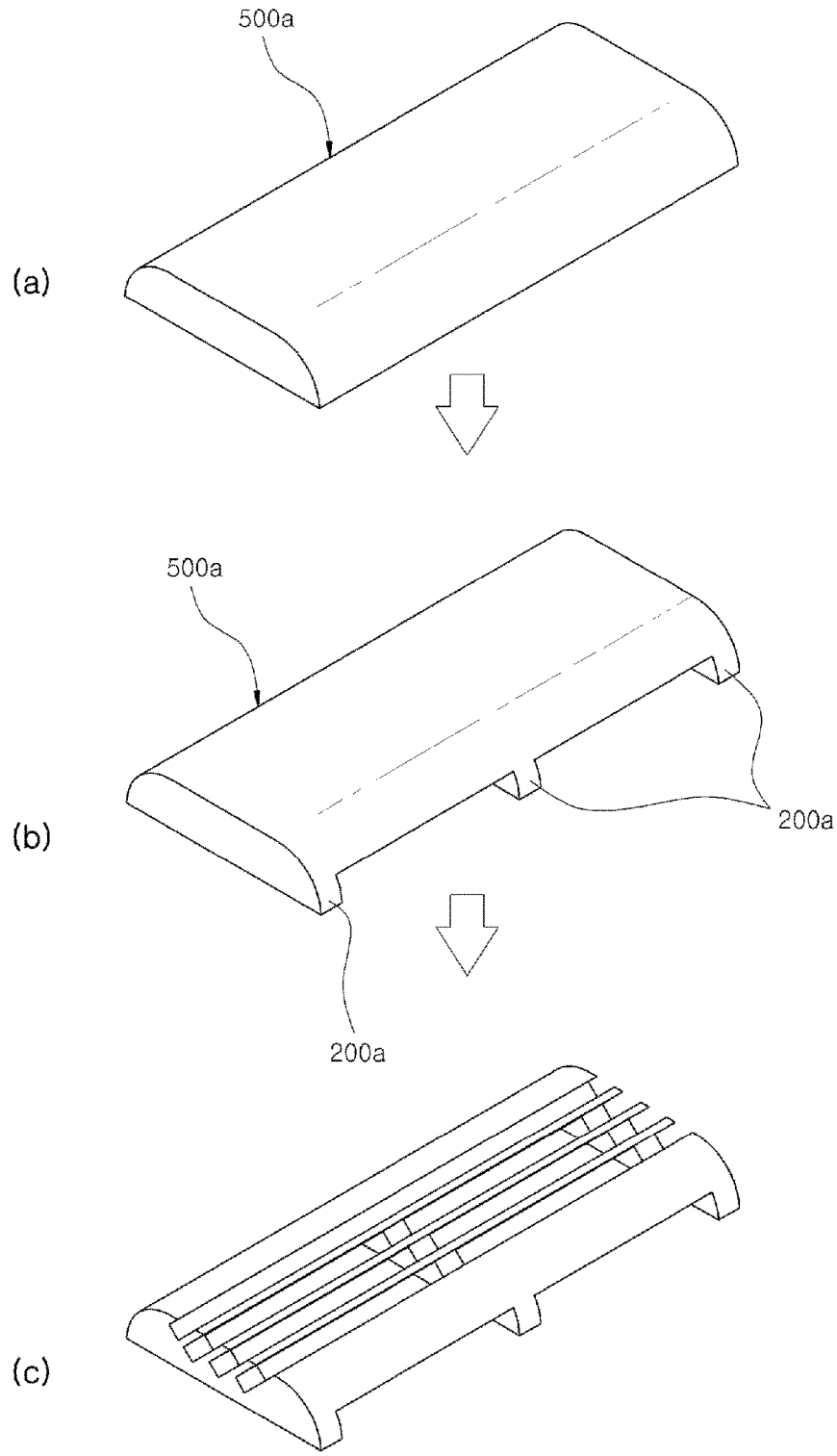

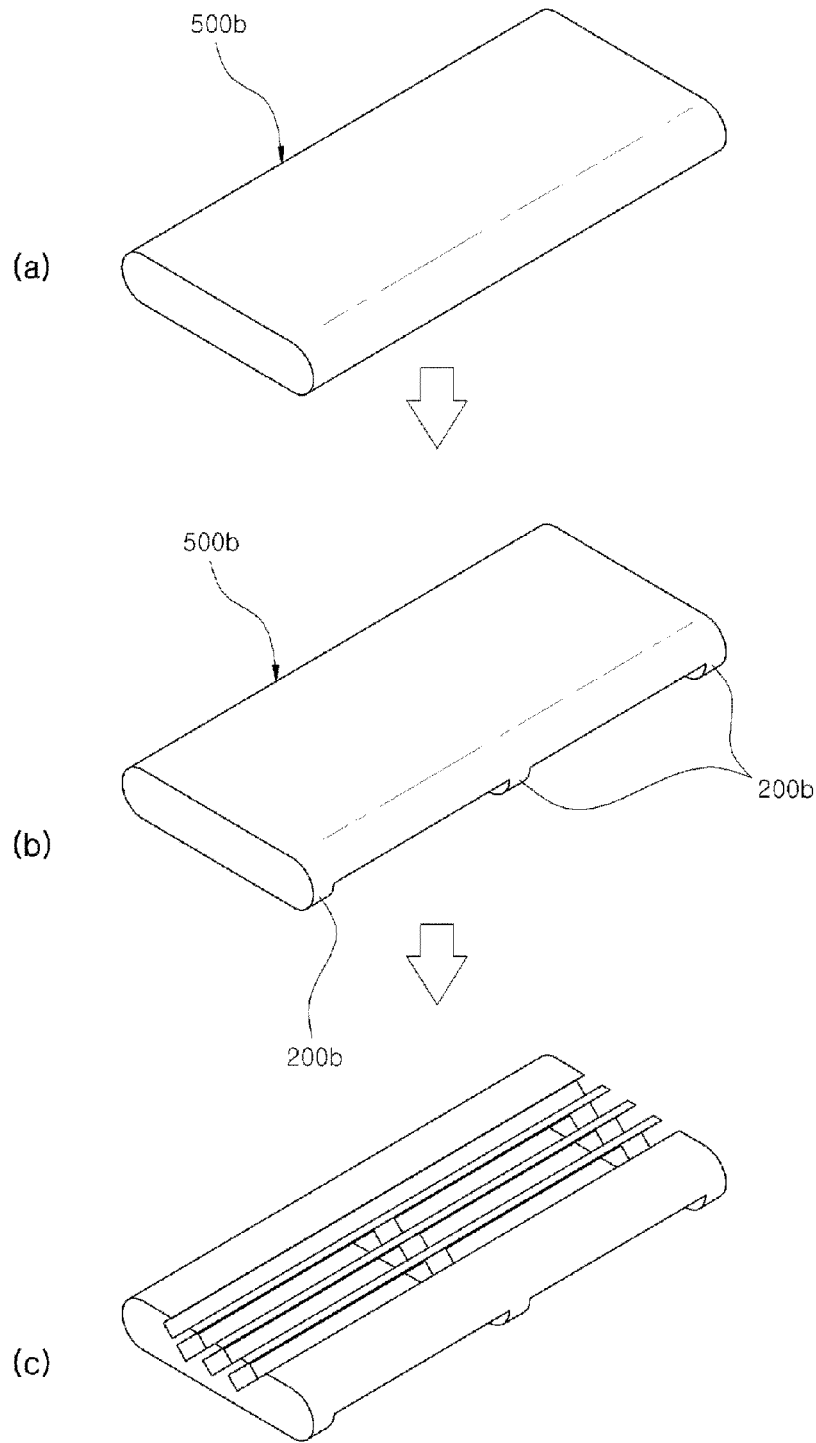

5300

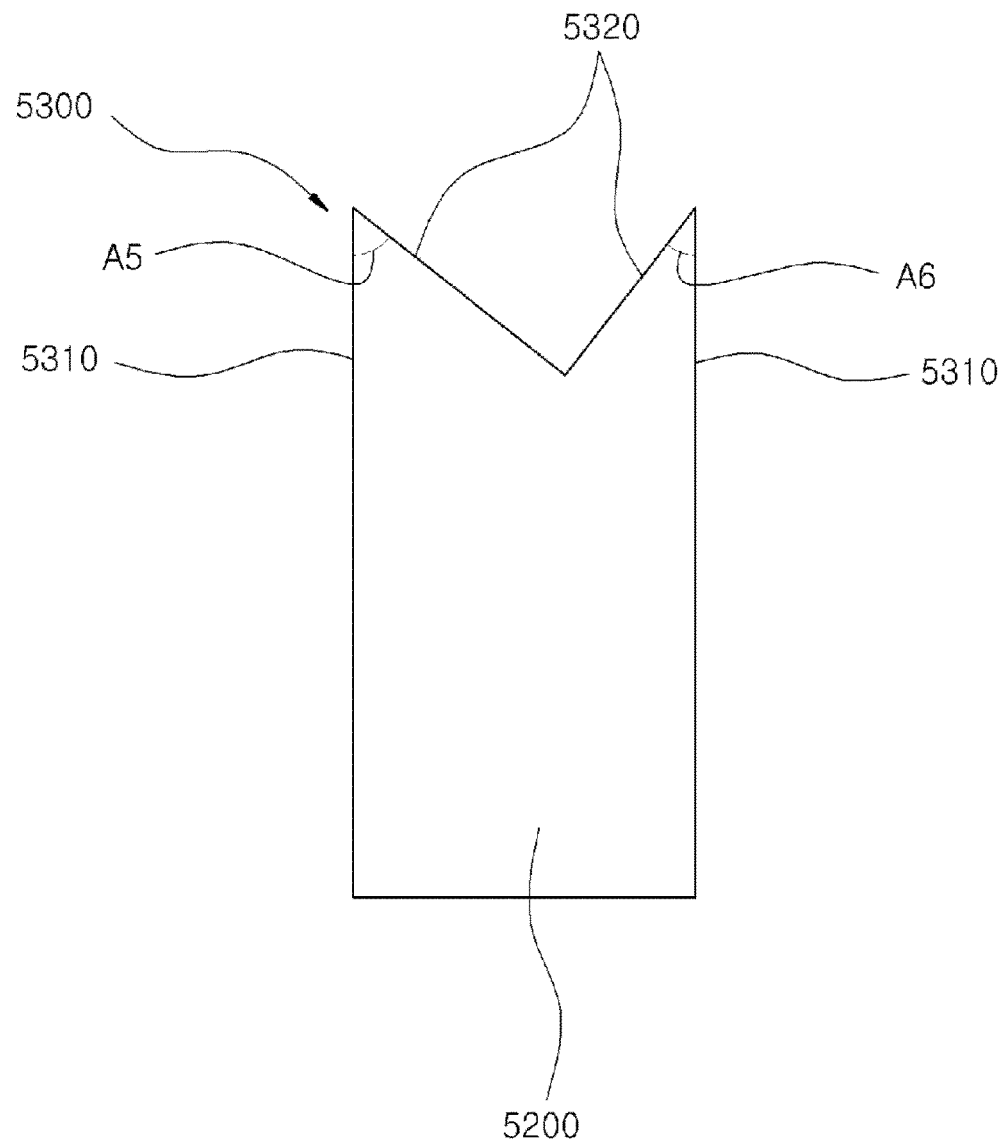

INTEGRATED MULTIPLE RAZOR BLADE AND MANUFACTURING METHOD THEREOF

CROSS REFERENCE TO RELATED APPLICATIONS

This application is the U.S. National Phase of International Application No. PCT/KR2014/002018, filed Mar. 11, 2014, designating the U.S. and published in Korean as WO/2014/208866 on Dec. 31, 2014 which claims the benefit of Korean Patent Application No. 10-2013-0074891, filed Jun. 27, 2013 and Korean Patent Application No. 10-2013-0111279, filed Sep. 16, 2013. All of the aforementioned applications, as well as any and all applications for which a foreign or domestic priority claim is identified here or in the Application Data Sheet as filed with the present application are hereby incorporated by reference under 37 CFR 1.57.

TECHNICAL FIELD

The present invention relates, in some embodiments, to an integrated multiple razor blade and manufacturing method thereof and, more specifically, to an integrated multiple razor blade capable of effectively reducing skin damage caused by the blade and a manufacturing method thereof.

BACKGROUND ART

Generally, razor blades are used to shave in contact with user's skin.

FIG. 1 is a schematic cross-sectional view illustrating a razor blade cartridge in the related art.

As illustrated in FIG. 1, since end portions 11 of razor blades (10) in the related art are provided to come in diagonally linear contact with the skin contact portion, the end portions 11 come in deeply linear contact with the skin. Accordingly, even in a case of little carelessness during shaving, there is a high risk of getting a cut by the end portions 11 of the razor blades 10.

The razor blades 10 are individually manufactured and then assembled. However, in such an assembling course, there is a problem that the razor blades 10 are assembled to have heights of the razor blades 10 and intervals of the razor blades 10, differently from intended. Such a problem may damage the skin during shaving, and may further cause a risk such as a cut of the skin.

In addition, since most of such blades are made of steel, it is difficult to keep a good affinity for contact with the skin.

Such steel razor blades may be polluted and deteriorate by oxidation due to frequent contact with moisture and air during using, and in severe cases, the razor blades may rust, making it difficult to shave, so that the razor blades have to be frequently replaced. Also, there is a problem that the skin may be damaged by excessive shaving and bacteria may breed on the damaged part.

SUMMARY

In order to solve such problems, the technical object of the invention, in at least some embodiments, is to provide an integrated multiple razor blade capable of effectively reducing skin damage caused by the blade, and a manufacturing method thereof.

In order to achieve the technical object, according to an embodiment of the invention, there is provided an integrated multiple razor blade including: a frame portion which has a predetermined length and is formed to be separated at predetermined intervals along one direction; and a razor blade portion which is formed integrally with the frame portion and has a plurality of razor blades.

In the embodiment, the razor blade portion includes: a plurality of main razor blades which are formed integrally with the frame portion, are formed obliquely in one direction, and have a first face contact portion formed flatly to come in face contact with the skin at an end portion; a head which is formed integrally with the frame portion, is formed at a front of the main razor blades with respect to a shaving direction, has a second face contact portion formed flatly and provided on an extending line of the first face contact portion at an end portion, and has a guide portion formed obliquely at a front of the second face contact portion; and a precise razor blade which is formed integrally with the frame portion, is formed obliquely in one direction at a rear of the main razor blades with respect to the shaving direction, and has a third face contact portion provided on the extending line of the first face contact portion and formed flatly to come in face contact with the skin at an end portion.

In the embodiment of the invention, the precise razor blade is formed to be shorter than the main razor blades, and the third face contact portion has an area smaller than the area of the first face contact portion.

In the embodiment of the invention, the precise razor blade has a blade angle which is less than or equal to 90° relative to the third face contact portion, and the main razor blades are formed to have the same or different blade angles, blade intervals, and thicknesses.

In the embodiment of the invention, the main razor blades have blade angles equal to or less than 90° relative to the first face contact portion, and the main razor blades are formed to have the same or different blade angles, blade intervals, and thicknesses.

In the embodiment of the invention, one or more main razor blades are formed.

In the embodiment of the invention, the razor blade portions are formed on both sides of the frame portion, and the razor blade portions are formed to be symmetric about the frame portion and are formed to have shaving directions opposite to each other.

In the embodiment of the invention, the razor blade portions are formed integrally with the frame portion at an upper end portion and a lower end portion of the frame portion, and have razor blades having a fourth face contact portion formed flatly to come in face contact with the skin at an end portion, and the razor blades are formed to have the same shaving direction.

In the embodiment of the invention, the razor blade portion is formed integrally with the frame portion at an upper end portion or a lower end portion of the frame portion, and has razor blades having a fifth face contact portion formed flatly to come in face contact with the skin at an end portion, and the razor blades are formed to be symmetric about a longitudinal center axis of the frame portion, and are formed to have shaving directions opposite to each other.

In the embodiment of the invention, the razor blade portion is formed integrally with the frame portion at an upper end portion or a lower end portion of the frame portion, and has razor blades having an entire outside forming a sixth face contact portion, and the razor blades are formed to have the same shaving direction.

In the embodiment of the invention, the frame portion and the razor blade portion are made of a wear-resistant and high-strength ceramic material.

Meanwhile, in order to achieve the technical objects, according to an embodiment of the invention, a manufacturing method of an integrated multiple razor blade, comprising the steps of: forming a frame portion which has a predetermined length by processing an integrated structure and is formed to be separated at predetermined intervals along one direction; and forming a razor blade portion which is formed integrally with the frame portion by processing the integrated structure and has a plurality of razor blades formed perpendicularly to the frame portion.

In the embodiment of the invention, the step of forming the razor blade portion includes processing and forming: a plurality of main razor blades which are formed integrally with the frame portion, are formed obliquely in one direction, and have a first face contact portion formed flatly to come in face contact with the skin at an end portion; a head which is formed integrally with the frame portion, is formed at a front of the main razor blades with respect to a shaving direction, has a second face contact portion formed flatly and provided on an extending line of the first face contact portion at an end portion, and has a guide portion formed obliquely at a front of the second face contact portion; and a precise razor blade which is formed integrally with the frame portion, is formed obliquely in one direction at a rear of the main razor blades with respect to the shaving direction, and has a third face contact portion provided on the extending line of the first face contact portion and formed flatly to come in face contact with the skin at an end portion.

In the embodiment of the invention, in the step of forming the razor blade portion, the razor blade portions are formed on both sides of the frame portion, and the razor blade portions are formed to be symmetric about the frame portion and are formed to have shaving directions opposite to each other.

In the embodiment of the invention, in the step of forming the razor blade portion, razor blades are processed and formed integrally with the frame portion at an upper end portion and a lower end portion of the frame portion, the razor blades have a fourth face contact portion formed flatly to come in face contact with the skin at an end portion, and the razor blades are processed and formed to have the same shaving direction.

In the embodiment of the invention, in the step of forming the razor blade portion, razor blades are processed and formed integrally with the frame portion at an upper end portion or a lower end portion of the frame portion, the razor blades have a fifth face contact portion formed flatly to come in face contact with the skin at an end portion, and the razor blades are formed to be symmetric about a longitudinal center axis of the frame portion, and are processed and formed to have shaving directions opposite to each other.

In the embodiment of the invention, in the step of forming the razor blade portion, razor blades are processed and formed integrally with the frame portion at an upper end portion or a lower end portion of the frame portion, an entire outside of the razor blades forms a sixth face contact portion, and the razor blades are processed and formed to have the same shaving direction.

ADVANTAGEOUS EFFECT(S) OF CERTAIN EMBODIMENTS OF INVENTION

According to an embodiment of the invention, a first face contact portion which guides to horizontally and flatly come in face contact with the skin may be formed at end portions of main razor blades. The first face contact portion comes in face contact with user's skin during shaving, and can effectively prevent damage such as a cut of the skin which may occur by end portions of razor blades in the related art coming in diagonally linear contact with user's skin.

In addition, according to an embodiment of the invention, since a precise razor blade may be formed at a rear of the main razor blades with respect to a shaving direction and may be formed with a narrow area to be shorter than a length of the main razor blades, it is possible to precisely shave. In addition, a third face contact portion is formed flatly to come in face contact with the skin even at an end portion of the precise razor blade, to effectively prevent damage such as a cut of the skin.

In addition, according to an embodiment of the invention, the frame portion and the razor blade portion may be made of a ceramic material. Therefore, the integrated multiple razor blade according to certain embodiments of the invention has no oxidation and corrosion like razor blades made of steel, less damage and wear of end portions of razor blades, and less worry about pollution and deterioration. In addition, washing is easy, and it is possible to effectively prevent bacteria breeding.

Advantages of the invention, in at least some embodiments, are not limited to the advantages described above, and it should be understood that they include all advantages which can be deduced from configurations of various embodiments of the invention disclosed in detailed description and Claims of the present application.

BRIEF DESCRIPTION OF DRAWING(S)

FIG. 6a to FIG. 6c are exemplary diagrams illustrating shapes according to flow of the manufacturing method of the integrated multiple razor blade according to the first embodiment of the invention.

FIG. 14 is a side view illustrating the integrated multiple razor blade according to the fifth embodiment of the invention.

DETAILED DESCRIPTION OF CERTAIN EMBODIMENT(S)

Figure 1:
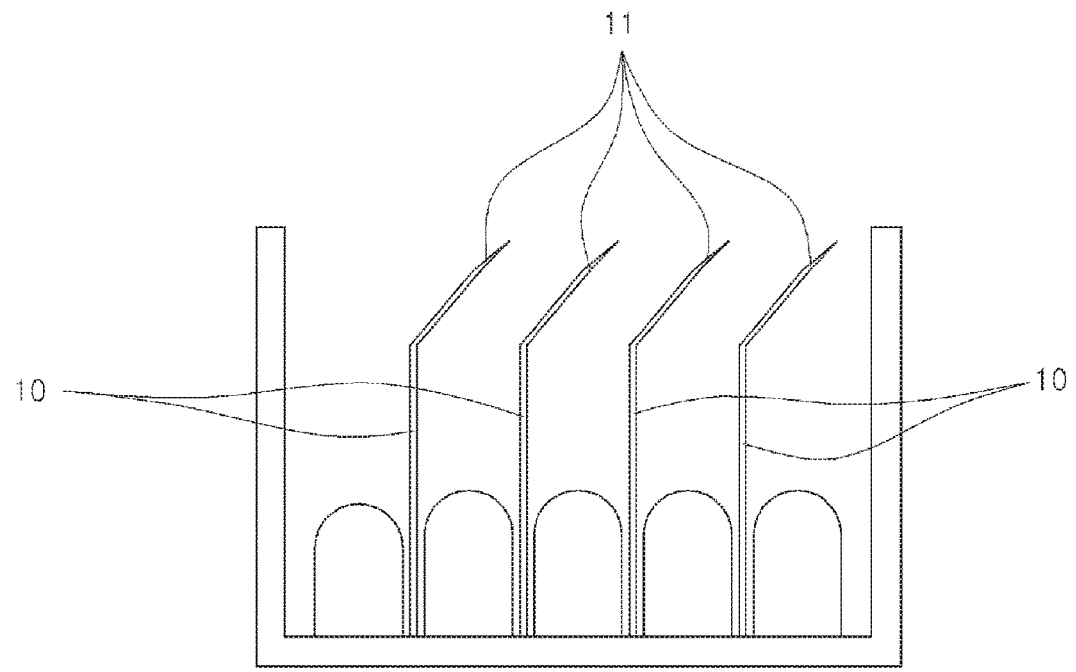
FIG. 1 is a schematic cross-sectional view illustrating an example of a razor blade cartridge in the related art.

Hereinafter, at least some embodiments of the present invention will be described with reference to the accompanying drawings. However, the invention may be embodied in various aspects, and is not limited to embodiments described herein. In the drawings, parts irrespective of description are omitted to clearly describe various embodiments of the invention, and similar reference signs are attached to similar parts throughout the specification.

In the whole of the specification, when it is described that any part is "connected" to the other part, this case includes "indirect connection" through the other part therebetween as well as "direct connection". In addition, when any part "includes" any constituent element, this means that the part does not exclude the other constituent element but may further include the other constituent element as long as there is particularly opposite description.

Hereinafter, the embodiments of the invention will be described in detail with reference to the accompanying drawings.

Figure 2:
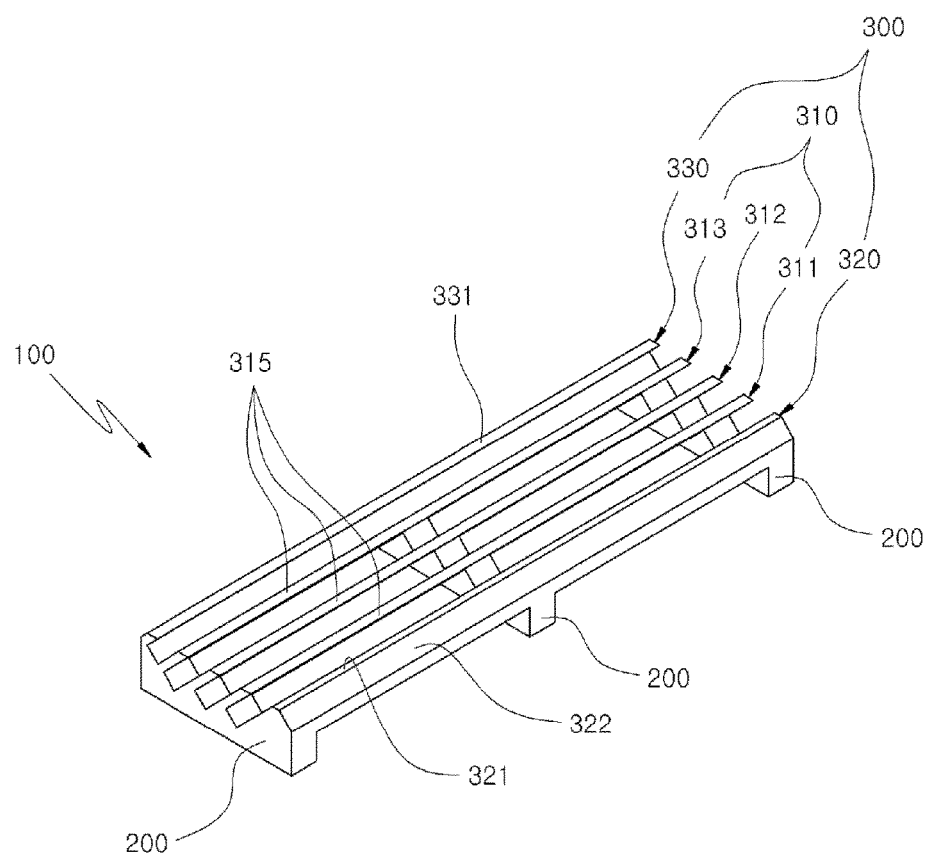
FIG. 2 is a perspective top view illustrating an integrated multiple razor blade according to a first embodiment of the invention.
Figure 3:
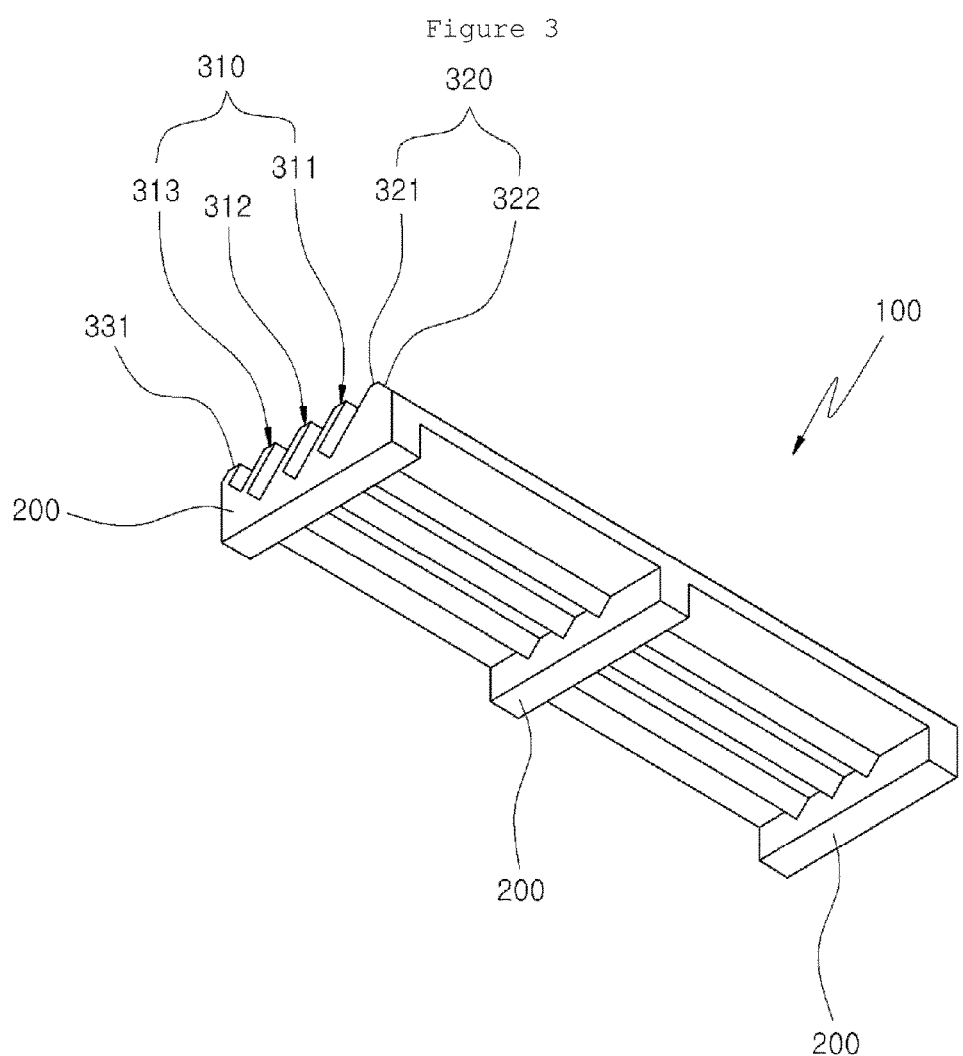
FIG. 3 is a perspective bottom view illustrating the integrated multiple razor blade according to the first embodiment of the invention.
Figure 4:
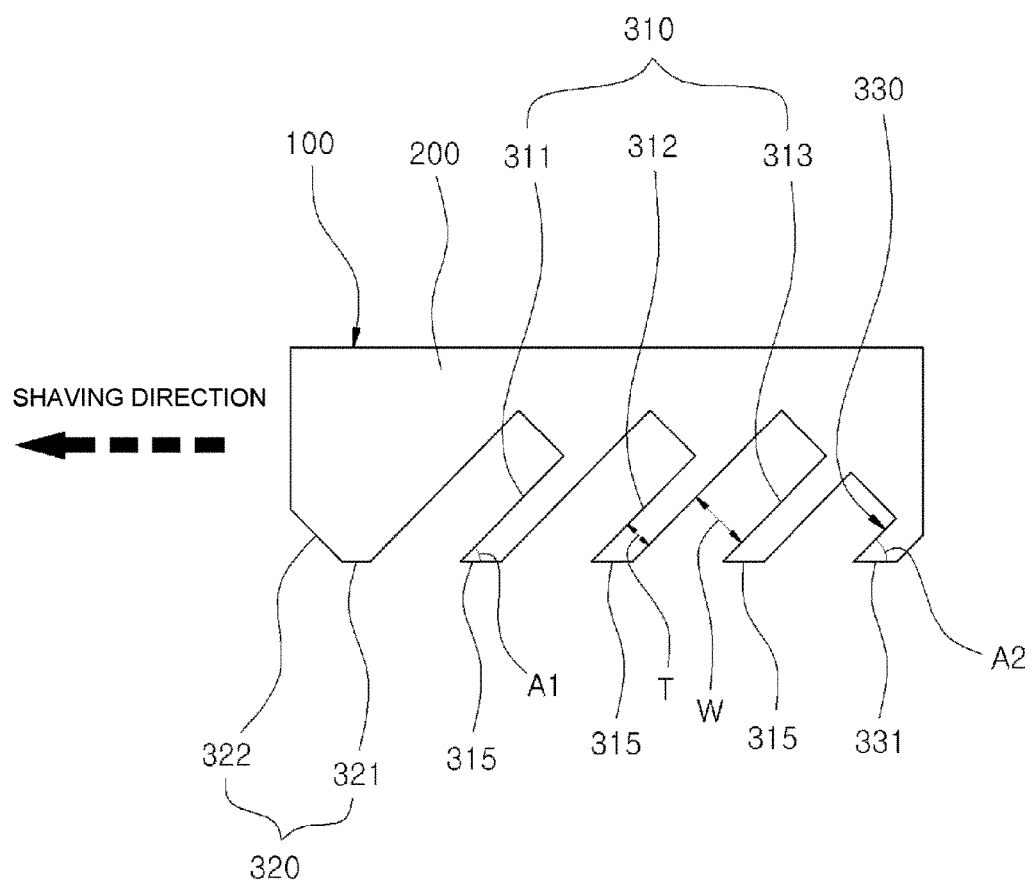
FIG. 4 is a side view illustrating the integrated multiple razor blade according to the first embodiment of the invention.

FIG. 2 is a perspective top view illustrating an integrated multiple razor blade according to a first embodiment of the invention, FIG. 3 is a perspective bottom view illustrating the integrated multiple razor blade according to the first embodiment of the invention, and FIG. 4 is a side view illustrating the integrated multiple razor blade according to the first embodiment of the invention.

As illustrated in FIG. 2 to FIG. 4, an integrated multiple razor blade 100 according to a first embodiment of the invention may include a frame portion 200 and a razor blade portion 300.

The frame portion 200 may be formed to have a predetermined length, and may be formed to be separated at predetermined intervals along one direction. The frame portion 200 may be formed to be separated at intervals different from each other.

In the first embodiment of the invention, it is described that the frame portion 200 is formed at both ends and the center of the integrated multiple razor blade 100, but the formation position and the shape of the frame portion 200 are not necessarily limited thereto.

The razor blade portion 300 may be formed integrally with the frame portion 200, and may have a plurality of razor blades 310 and 330 formed perpendicularly to the frame portion 200 and obliquely in one direction.

The razor blade portion 300 may have a main razor blade 310, a head 320, and a precise razor blade 330.

The main razor blade 310 may be formed integrally with the frame portion 200. The main razor blade 310 may be formed obliquely in one direction.

In addition, a first face contact portion 315 may be formed at an end portion of the main razor blade 310.

The first face contact portion 315 may be formed flatly to come in face contact with the skin, and the first face contact portion 315 may come in face contact with the user's skin.

The first face contact portion 315 comes in face contact with user's skin during shaving, and can effectively prevent damage such as a cut on the skin by an end portion of a razor blade coming in linear contact with user's skin like a razor blade in the related art.

The main razor blade 310 may be positioned at the center of the razor blade portion 300, and plays a main role of shaving user's beard during shaving.

The number of main razor blades 310 may be one or more considering elements related to shaving performance such as a contact area between the first face contact portion 315 and the skin, an angle of the razor blade, a thickness of the razor blade, and an interval of the razor blades. For example, when two main razor blades 310 are formed and one precise razor blade 330 is formed, triple razor blades including the precise razor blade 330 may be formed.

The main razor blade 310 may be formed to have a blade angle A1 equal to or less than 90° about the first face contact portion 315. In this case, as the blade angle A1 gets smaller, the shaving performance can be further improved.

When a plurality of main razor blades 310 is formed, the main razor blades 310 may be formed to have the same blade angle, blade interval W, and thickness T or blade angles, blade intervals W, and thicknesses T different from each other.

Since the main razor blade 310 is formed integrally with the frame portion 200, it is possible to fundamentally prevent problems of defects of height and interval of razor blades which may occur in the course of assembling razor blades individually manufactured in the related art.

In other words, since the main razor blades 311, 312, and 313 according to some embodiments of the invention are formed integrally with the frame portion 200, a process of assembling a razor blade cartridge in the related art may be omitted, and the main razor blades 311, 312, and 313 formed once can keep heights and intervals constant.

As described above, in order to improve a shaving effect considering characteristics of customer groups, for example, sex, thickness of body hair, strength of body hair, and shaving habit, blade angles, blade thicknesses, and blade intervals of the main razor blades 311, 312, and 313 may be the same or different. However, the heights and blade intervals of such main razor blades 311, 312, and 313 formed once are not changed.

The head 320 may be formed at a front of the main razor blade 310 with respect to a shaving direction, and may be formed integrally with the frame portion 200.

A second face contact portion 321 having a flat shape may be formed at an end portion of the head 320, and the second face contact portion 321 may be formed on an extending line of the first face contact portion 315 of the main razor blade 310.

A guide portion 322 may be formed at a front of the second face contact portion 321. The guide portion 322 may be formed obliquely or may be formed in a rounded shape. The guide portion 322 guides the head 320 provided at the forefront with respect to the shaving direction to move without damaging the skin during shaving.

The precise razor blade 330 may be formed integrally with the frame portion 200, and may be formed at a rear of the main razor blade 310 with respect to the shaving direction.

The precise razor blade 330 may be formed obliquely in one direction, that is, the same direction as the formation direction of the main razor blade 310.

In addition, a third face contact portion 331 may be formed flatly at an end portion of the precise razor blade 330 to come in face contact with the skin.

The third face contact portion 331 may be provided on the extending line of the first face contact portion 315, and thus can stably come in face contact with the skin with the main razor blade 310 during shaving.

In addition, the third face contact portion 331 may be formed to have an area narrower than an area of the first face contact portion 315. The precise razor blade 330 may be formed to shorter than a length of the main razor blade 310.

As described above, the precise razor blade 330 is formed at the rear of the main razor blade 310 with respect to the shaving direction, is formed at the rearmost in the shaving direction, and may be formed with an area narrower than the area of the first face contact portion 315 of the main razor blade 310, and thus it is possible to precisely shave.

The precise razor blade 330 may be formed to have a blade angle A2 equal to or less than 90° about the third face contact portion 331. Herein, as the blade angle A2 of the precise razor blade 330 gets smaller, the shaving performance can be further improved. In addition, the number of precise razor blades 330 may be two or more. When the number of precise razor blades 330 is two or more, the precise razor blades 330 may be formed to have the same or different blade angles, blade intervals, and thicknesses.

Since the precise razor blade 330 is also formed integrally with the frame portion 200, it is possible to fundamentally prevent problems of defects of height and interval of razor blades.

The frame portion 200 and the razor blade portion 300 may be made of a wear-resistant and high-strength ceramic material. Accordingly, the integrated multiple razor blade 100 according to some embodiments of the invention has no oxidation and corrosion like razor blades made of steel, less damage and wear of end portions of razor blades, and less worry about pollution and deterioration. In addition, washing is easy, and it is possible to effectively prevent bacteria breeding.

Figure 5:
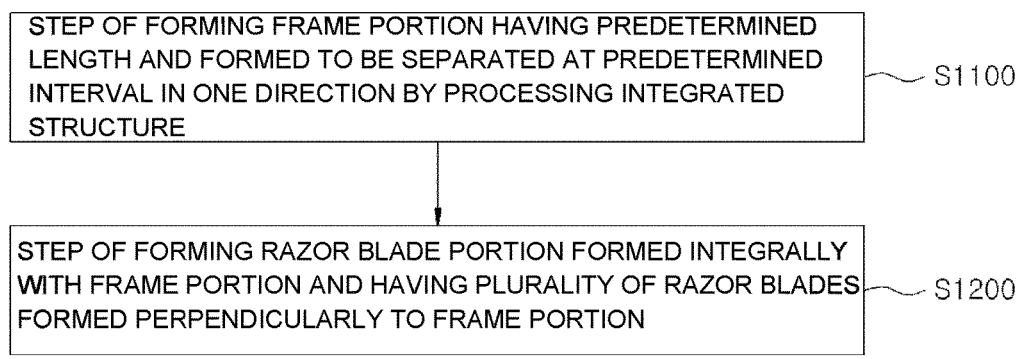
FIG. 5 is a flowchart illustrating a manufacturing method of the integrated multiple razor blade according to the first embodiment of the invention.

FIG. 5 is a flowchart illustrating a manufacturing method of the integrated multiple razor blade according to the first embodiment of the invention, and FIG. 6a to FIG. 6c are exemplary diagrams illustrating shapes according to flow of the manufacturing method of the integrated multiple razor blade according to the first embodiment of the invention.

First, as illustrated in FIG. 5 and (a) and (b) of FIG. 6a, in Step S1100, an integrated structure 500 is processed to form a frame portion 200 which has a predetermined length and is formed to be separated at predetermined intervals.

Herein, the integrated structure 500 may have a cube shape, and may be made of a wear-resistant and high-strength ceramic material.

Alternatively, as illustrated in (a) and (b) of FIG. 6b and (a) and (b) of FIG. 6c, the integrated structure 500 may be formed such that some of the sides are rounded.

The integrated structure 500 may be made by mixing a ceramic raw material, a binder, a plasticizer, and a stabilizer. Herein, the ceramic raw material may be high-purity fine powder having high strength, high attraction, partially stabilized good sinterability.

The ceramic raw material may be formed into the integrated structure through injection molding, and may be formed into a shape such as a cube shape, a semi-cylindrical shape, or an ellipse-cylindrical shape.

The frame portions 200, 200a, and 200b may be formed by processing lower portions of the integrated structures 500, 500a, and 500b.

The shape and formation position of the frame portion may be appropriately adjusted according to the size of the integrated multiple razor blade, strength of the ceramic material, and the like.

As illustrated in FIG. 5 and (c) of FIG. 6a, in Step S1200, the integrated structure 500 is processed to a razor blade portion 300 formed integrally with the frame portion 200 and having a plurality of razor blades 310 and 330, formed perpendicularly to the frame portion 200.

In Step S1200 of forming the razor blade portion, a plurality of main razor blades 311, 312, and 313 may be processed and formed, which are formed integrally with the frame portion 200, are formed obliquely in one direction, and has a first face contact portion 315 formed flatly at an end portion to come in face contact with the skin.

A head 320 may be processed and formed, which is formed integrally with the frame portion 200, is formed at a front of the main razor blades 310 with respect to a shaving direction, has a second face contact portion 321 formed flatly and provided on an extending line of the first face contact portion 315 at an end portion, and has a guide portion 322 formed obliquely at a front of the second face contact portion 321

In addition, a precise razor blade 330 may be processed and formed, which is formed integrally with the frame portion 200, is formed obliquely in one direction at a rear of the main razor blades 310 with respect to the shaving direction, and has a third face contact portion 331 provided on the extending line of the first face contact portion 315 and formed flatly to come in face contact with the skin at an end portion.

The sequence of processing and forming the main razor blades 310, the head 320, and the precise razor plate 330 is not particularly limited, and may be appropriately adjusted considering the convenience of processing and the like.

In addition, it is obvious that the processes described above can be also applied in the same manner to (c) of FIG. 6b and (c) of FIG. 6c.

Hereinafter, another embodiment of an integrated multiple razor blade will be described.

Figure 7:
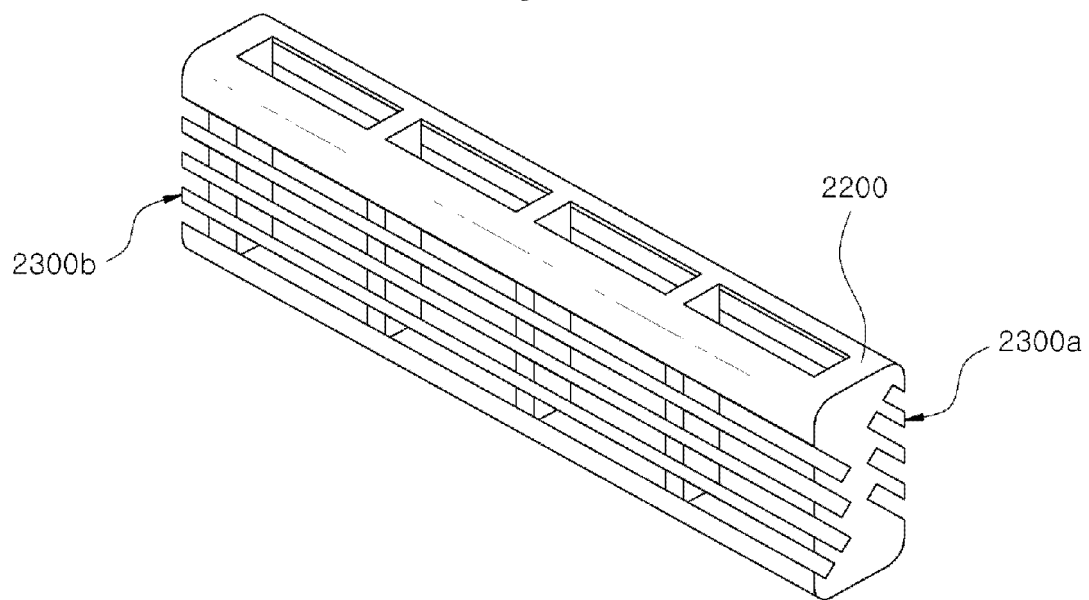
FIG. 7 is a perspective view illustrating an integrated multiple razor blade according to a second embodiment of the invention.
Figure 8:
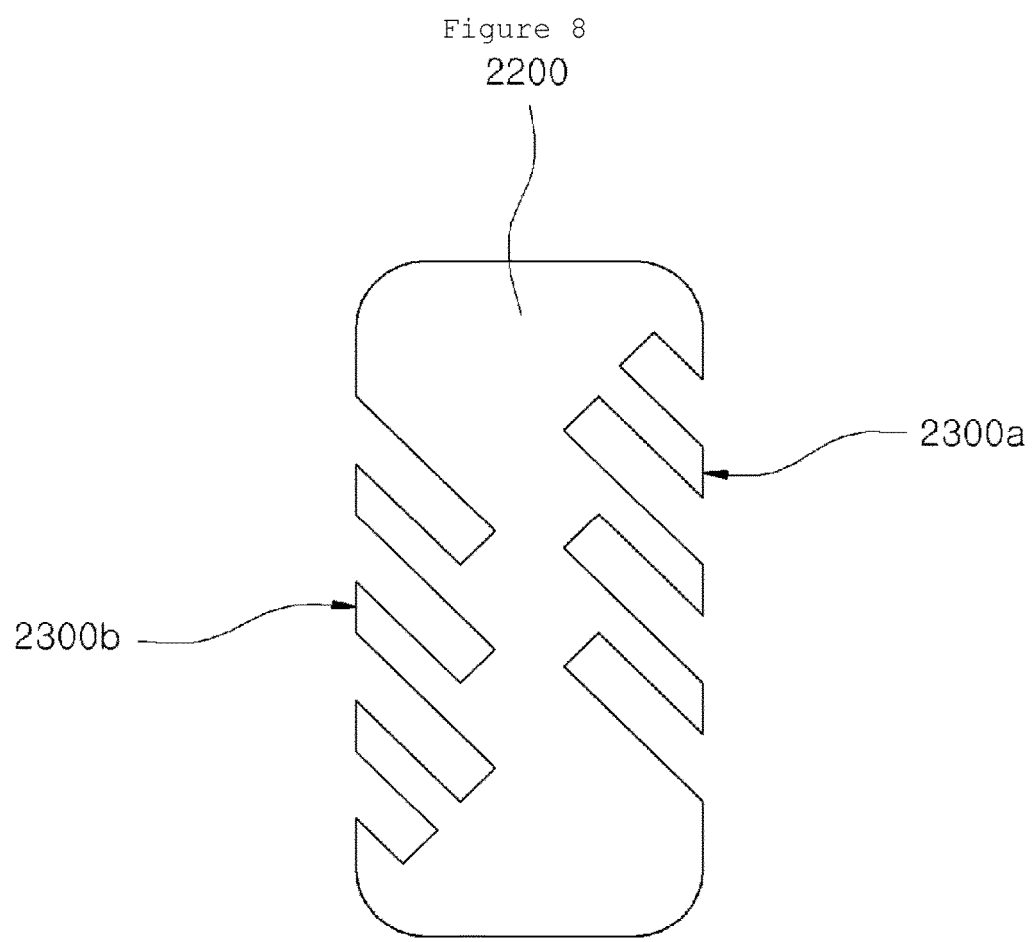
FIG. 8 is a side view illustrating the integrated multiple razor blade according to the second embodiment of the invention.

First, FIG. 7 is a perspective view illustrating an integrated multiple razor blade according to a second embodiment of the invention, and FIG. 8 is a side view illustrating the integrated multiple razor blade according to the second embodiment of the invention. In the integrated multiple razor blade according to the embodiment, razor blade portions may be formed on both sides of a frame, the other configurations are the same as those of the first embodiment described above, and thus the description is omitted.

As illustrated in FIG. 7 and FIG. 8, the razor blade portions 2300a and 2300b of the integrated multiple razor blade according to the second embodiment of the invention may be formed on both sides of the frame portion 2200.

The razor blade portions 2300a and 2300b formed on both sides of the frame portion 2200 are formed to be symmetric about the center of the frame portion 2200, and may be formed to have shaving directions opposite to each other.

Accordingly, when one side razor blade is worn, it is possible to shave using the other side razor blade, the term of use can be increased, and two-way shaving is possible.

In addition, in order to provide different shaving conditions by the razor blade portions 2300a and 2300b, blade angles, blade intervals, and razor blade thicknesses of the razor blade portions 2300a and 2300b formed on both sides of the frame portion 2200 may be different from each other, and usability can be improved.

Figure 9:
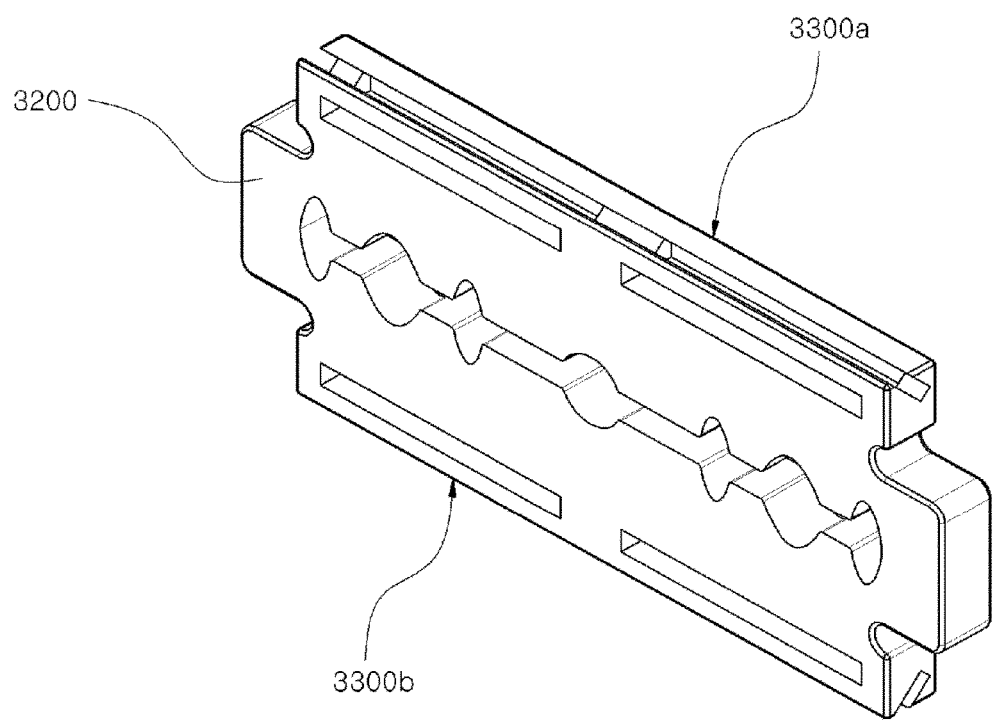
FIG. 9 is a perspective view illustrating an integrated multiple razor blade according to a third embodiment of the invention.
Figure 10:
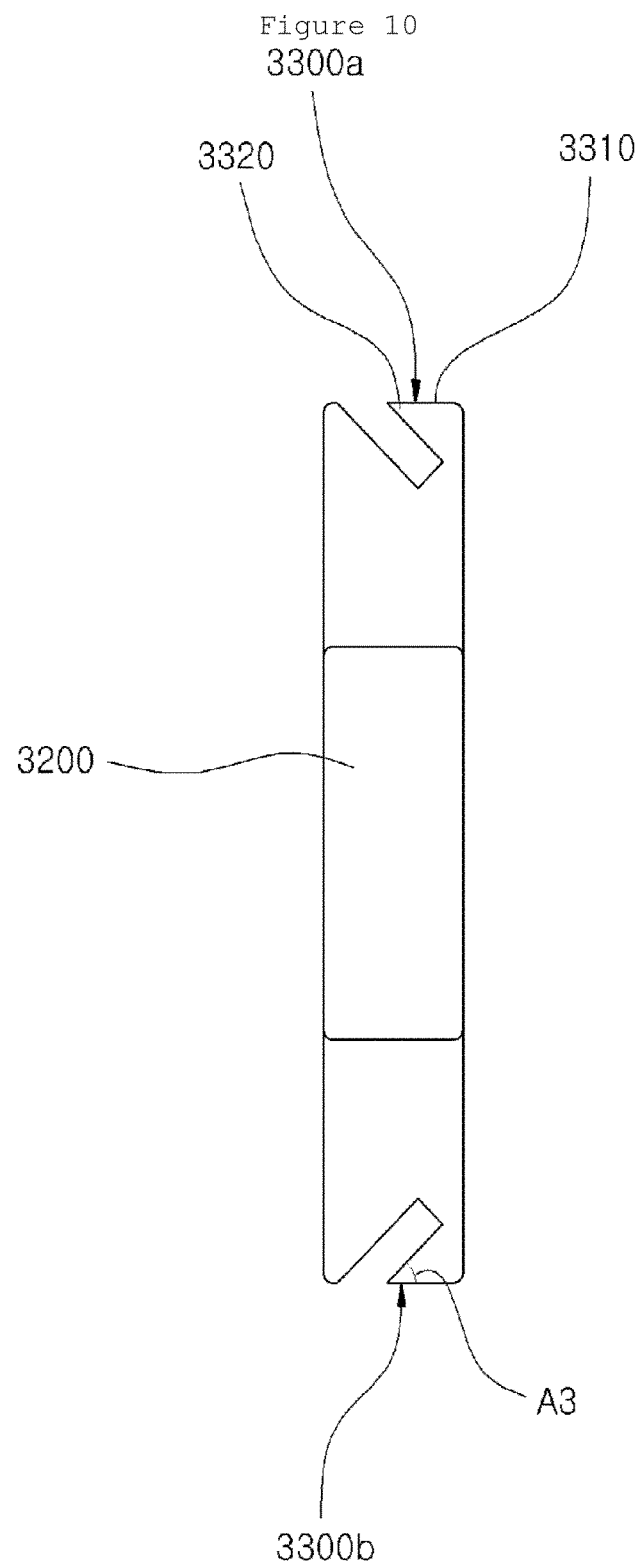
FIG. 10 is a side view illustrating the integrated multiple razor blade according to the third embodiment of the invention.

Meanwhile, FIG. 9 is a perspective view illustrating an integrated multiple razor blade according to a third embodiment of the invention, and FIG. 10 is a side view illustrating the integrated multiple razor blade according to the third embodiment of the invention.

As illustrated in FIG. 9 and FIG. 10, in the integrated multiple razor blade according to the third embodiment of the invention, razor blade portions 3300a and 3300b may be formed integrally with a frame portion 3200 at an upper end portion and a lower end portion of the frame portion 3200.

The razor blade portions 3300a and 3300b may have a razor blade 3320 having a fourth face contact portion 3310. The fourth face contact portion 3310 may be formed at an end portion of the razor blade 3320, and the fourth face contact portion 3310 may be formed flatly to come in face contact with the user's skin.

In addition, the razor blades 3320 may be formed to have the same shaving direction. In other words, the razor blades 3320 formed at the upper end portion and the lower end portion of the frame portion 3200 may be formed to have the same shaving direction.

The razor blade 3320 may be formed to have a blade angle A3 equal to or less than 90° about the fourth face contact portion 3300a. The razor blades 3320 may be formed to have the same or different blade angles A3, and thus the razor blades 3320 may be formed to have the same or different thicknesses. In addition, a plurality of razor blades 3320 may be formed at the upper end portion and the lower end portion of the frame portion 3200 and, in this case, the razor blades 3320 may be formed to have the same or different blade angles, blade intervals, and thicknesses.

Figure 11:
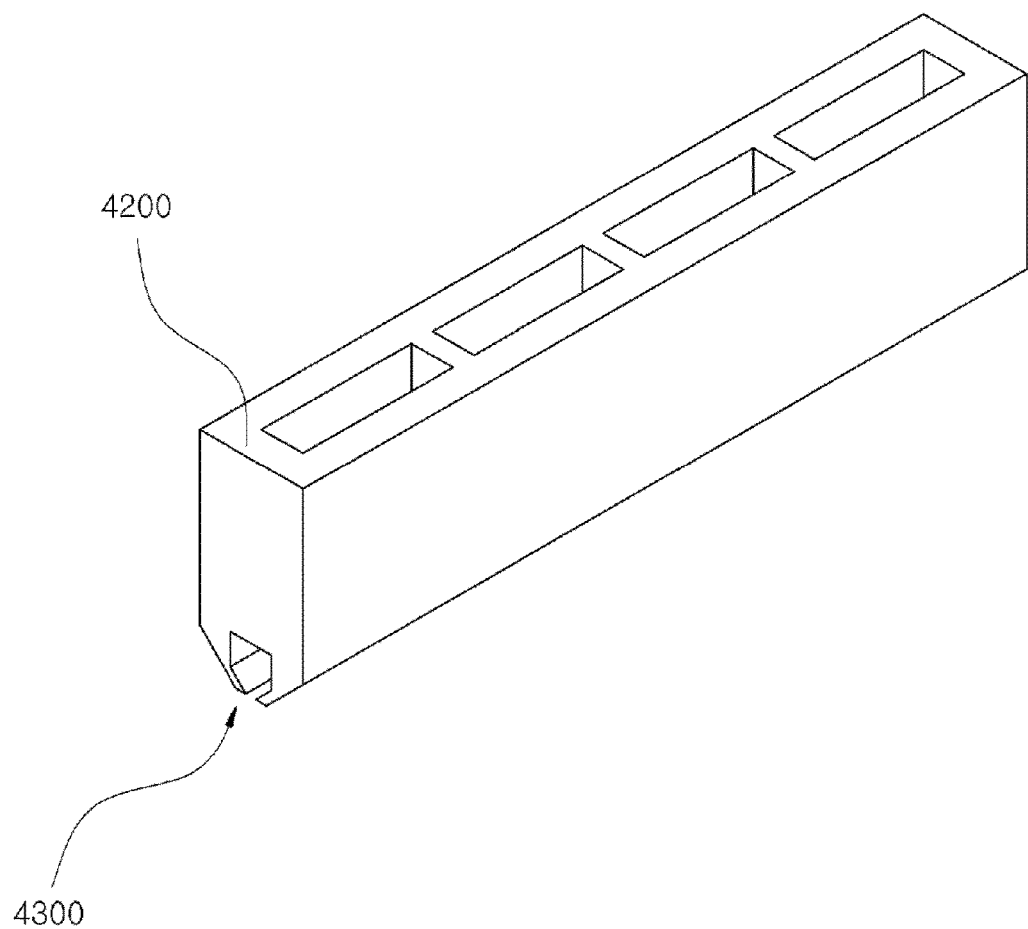
FIG. 11 is a perspective view illustrating an integrated multiple razor blade according to a fourth embodiment of the invention.
Figure 12:
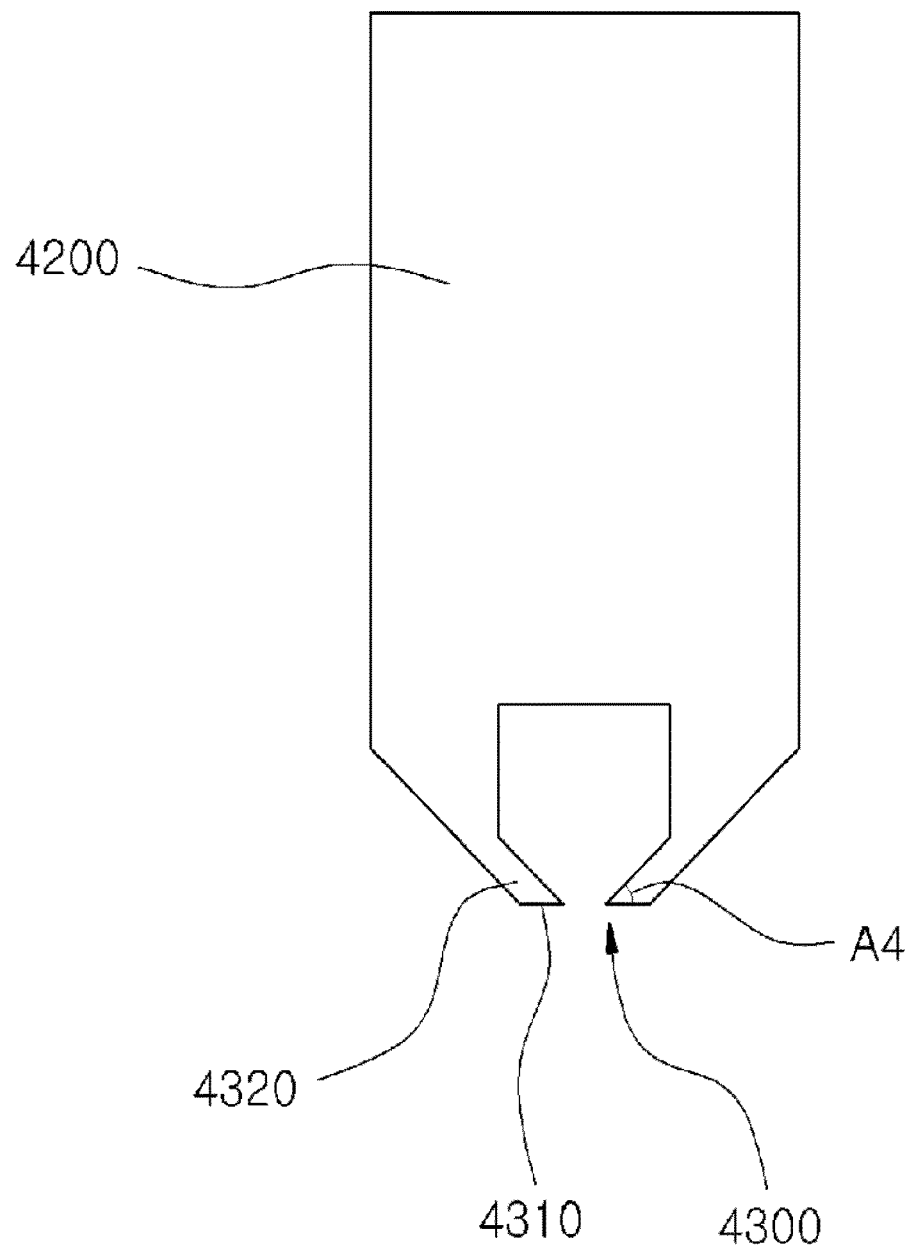
FIG. 12 is a side view illustrating the integrated multiple razor blade according to the fourth embodiment of the invention.

FIG. 11 is a perspective view illustrating an integrated multiple razor blade according to a fourth embodiment of the invention, and FIG. 12 is a side view illustrating the integrated multiple razor blade according to the fourth embodiment of the invention.

As illustrated in FIG. 11 and FIG. 12, a razor blade portion 4300 of the integrated multiple razor blade according to the fourth embodiment of the invention may be formed integrally with a frame portion 4200 at an upper end portion or a lower end portion of the frame 4200. In other words, in FIG. 11 and FIG. 12, it is illustrated that the razor blade portion 4300 is formed at the lower end portion of the frame portion 4200, but the razor blade portion may be formed at the upper end portion not the lower end portion.

The razor blade portion 4300 may have razor blades 4320 having a fifth face contact portion 4310 formed flatly to come in face contact with the skin at an end portion.

In addition, the razor blades 4320 may be formed to be symmetric about a longitudinal center axis of the frame portion 4200, and may be formed to have shaving directions opposite to each other.

Accordingly, it is possible to shave in both directions by the integrated multiple razor blade according to the fourth embodiment of the invention.

The razor blade 4320 may be formed to have a blade angle 4A equal to or less than 90° about the fifth face contact portion 4310. In this case, as the blade angle A4 of the razor blade 4320 gets smaller, the shaving performance can be further improved.

In addition, the razor blades 4320 may be formed to have the same or different blade angles and thicknesses.

Figure 13:
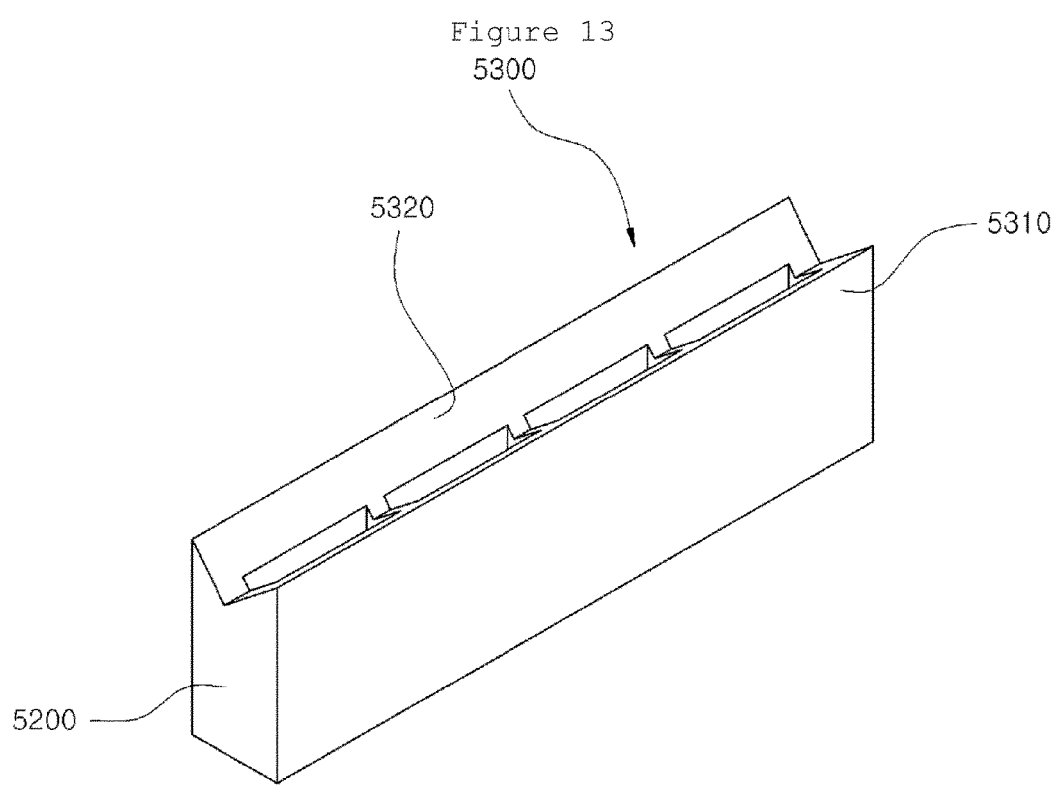
FIG. 13 is a perspective view illustrating an integrated multiple razor blade according to a fifth embodiment of the invention.

FIG. 13 is a perspective view illustrating an integrated multiple razor blade according to a fifth embodiment of the invention, and FIG. 14 is a side view illustrating the integrated multiple razor blade according to the fifth embodiment of the invention.

As illustrated in FIG. 13 and FIG. 14, a razor blade portion 5300 of an integrated multiple razor blade according to the fifth embodiment of the invention may be formed integrally with a frame portion 5200 at an upper end portion or a lower end portion of the frame portion 5200. In other words, in FIG. 13 and FIG. 14, it is illustrated that the razor blade portion 5300 is formed at the upper end portion of the frame portion 5200, but the razor blade portion may be formed at the lower end portion not the upper end portion.

The razor blade portion 5300 may have razor blades 5320, the entire outside of which forms a sixth face contact portion 5310, and the razor blades 5320 may be formed to have the same shaving direction.

In addition, the razor blades 5320 may be formed to have different blade angles A5 and A6, and may be formed to have different thicknesses different.

The blade angles A5 and A6 of the razor blades 5320 may be formed equal to or less than 90° about the sixth face contact portion 5310 and, in this case, as the blade angles A5 and A6 of the razor blades 5320 gets smaller, the shaving performance can be further improved.

Meanwhile, the razor blade 5320 may be formed to be symmetric about a longitudinal center axis of the frame portion 5200, and thus the blade angles A5 and A6 of the razor blades 5320 may be the same.

The above description of certain embodiments of the invention is exemplary, and it should be understood that a person skilled in the art can easily modify the embodiments to another embodiment without changing the technical spirit and essential characteristics of the invention. Therefore, it should be understood that the embodiments described above are exemplary in all aspects, and are not restrictive. For example, each constituent element which is described in a single form may be embodied to be dispersive and, similarly, the constituent elements which are described to be dispersive may be also embodied in a coupled form.

The scope of at least some embodiments of the invention is represented by Claims to be described below, and it should be interpreted that the meaning and scope of Claims and all the changed or modified forms derived from the equivalent concept thereof are included in the scope of various embodiments of the invention.

What is claimed is:

1. An integrated razor comprising:
    a frame portion which has a predetermined length and comprises a plurality of sections separated at predetermined intervals along one direction perpendicular to a long axis along the length of the frame portion, wherein the frame portion further comprises an upper end portion and a lower end portion opposite the upper end portion; and
    one or more razor blade portions which are formed integrally with the frame portion and comprise a plurality of razor blades each having a length extending perpendicular to the long axis along the length of the frame portion;
    wherein at least one of the one or more razor blade portions is formed integrally and made of the same material as the frame portion and each of the razor blades at least partially extends outward from the frame portion at the upper end portion or the lower end portion of the frame portion, such that at least part of each of the razor blades extends outwardly beyond, and above or below the frame portion; and wherein the frame portion and at least one of the one or more razor blade portions comprise a ceramic material.

2. The integrated razor according to claim 1, wherein the plurality of razor blades comprises:
  a plurality of main razor blades, each of which is formed integrally with the frame portion, is formed obliquely in one direction with respect to the long axis of the frame portion along the length of the frame portion, and comprises a first flat face contact portion at an end portion of the main razor blades, the first face contact portion being configured to come in contact with a skin of a user;
  a head which is formed integrally with the frame portion, is anterior to the main razor blades with respect to a shaving direction, comprises a second face contact portion having a flat surface and provided on an extending line of the first face contact portion at the end portion of the main razor blades, and comprises a guide portion oblique to a front of the second face contact portion; and
  a precise razor blade which is formed integrally with the frame portion, is formed obliquely in one direction posterior to the main razor blades with respect to the shaving direction, and comprises a third face contact portion provided on the extending line of the first face contact portion and having a flat surface to come in contact with the skin at the end portion of the main razor blades.

3. The integrated razor according to claim 2, wherein the precise razor blade is shorter in length than the main razor blades, and the third face contact portion has an area smaller than an area of the first face contact portion.

4. The integrated razor according to claim 2, wherein the precise razor blade has a blade angle equal to less than 90° with respect to the third face contact portion, and the main razor blades have the same or different blade angles, blade intervals, and thicknesses.

5. The integrated razor according to claim 2, wherein the main razor blades have blade angles equal to or less than 90° with respect to the first face contact portion, and the main razor blades have the same or different blade angles, blade intervals, and thicknesses.

6. The integrated razor according to claim 2, wherein the one or more razor blade portions are formed on both sides of the frame portion, and the one or more razor blade portions are formed to be symmetric about the frame portion and are formed to have shaving directions opposite to each other.

7. The integrated razor according to claim 1, wherein the razor blades have a face contact portion having a flat surface to come in contact with a skin of a user at an end portion of the razor blades, and the razor blades are all configured to shave in the same direction.

8. The integrated razor according to claim 1, wherein the razor blades have a face contact portion formed flatly to come in contact with a skin of a user at an end portion of the razor blades, and the razor blades are formed to be symmetric about a longitudinal center axis of the frame portion, and are formed to have shaving directions opposite to each other.

9. The integrated razor according to claim 1, wherein the razor blades have an entire outside forming a face contact portion, and the razor blades are formed to have the same shaving direction.

10. The integrated razor according to claim 1, wherein the ceramic material is a wear-resistant and high-strength.

11. A method of manufacturing an integrated razor, comprising:
  forming a frame portion which has a predetermined length by processing an integrated structure, wherein the frame portion comprises a plurality of sections separated at a predetermined interval along one direction perpendicular to a long axis along the length of the frame portion, wherein the frame portion further comprises an upper end portion and a lower end portion opposite the upper end portion; and
  forming one or more razor blade portions by integrally forming a plurality of razor blades, wherein the plurality of razor blades are integrally connected with the frame portion at the upper end portion and the lower end portion of the frame portion and wherein each of the razor blades has a length extending perpendicularly to the long axis along the length of the frame portion and at least partially extends outward from the frame portion, such that at least part of each of the razor blades extends outward beyond the frame portion.

12. The method according to claim 11, wherein said forming the plurality of razor blades comprises:
  permanently connecting a plurality of main razor blades with the frame portion obliquely in one direction with respect to the long axis of the frame portion along the length of the frame portion, wherein the main razor blades comprise a first face contact portion having a flat surface to come in contact with a skin of a user at an end portion of the main razor blades;
  a head which is formed integrally with the frame portion, is formed at a front of the main razor blades with respect to a shaving direction, comprises a second face contact portion formed flatly and provided on an extending line of the first face contact portion at the end portion of the main razor blades, and comprises a guide portion formed obliquely at a front of the second face contact portion; and
  a precise razor blade which is formed integrally with the frame portion, is formed obliquely in one direction at a rear of the main razor blades with respect to the shaving direction, and comprises a third face contact portion provided on the extending line of the first face contact portion and formed flatly to come in contact with the skin at the end portion of the main razor blades.

13. The method according to claim 12, wherein in said forming the one or more razor blade portions, the one or more razor blade portions are formed on both sides of the frame portion, and the one or more razor blade portions are formed to be symmetric about the frame portion and are formed to have shaving directions opposite to each other.

14. The method according to claim 11, wherein in said forming the one or more razor blade portions, the razor blades have a face contact portion formed flatly to come in contact with a skin of a user at an end portion of the razor blades, and the razor blades are permanently connected to have the same shaving direction.

15. The method according to claim 11, wherein in said forming the one or more razor blade portions, the razor blades have a face contact portion formed flatly to come in contact with a skin of a user at an end portion of the razor blades, and the razor blades are permanently connected to be symmetric about a longitudinal center axis of the frame portion, and to have shaving directions opposite to each other.

16. The method according to claim 11, wherein in said forming the one or more razor blade portions, an entire outside of the razor blades forms a face contact portion, and the razor blades are permanently connected to have the same shaving direction.

17. The method according to claim 11, further comprising providing a raw structure, wherein the frame portion is formed by processing a lower portion of the raw structure, and the blade portion is formed by processing an upper portion of the raw structure.

\* \* \* \* \*